(12) United States Patent
Glockseisen

(10) Patent No.: US 11,346,732 B2
(45) Date of Patent: May 31, 2022

(54) CRIMPING PLIERS, GROUP OF CRIMPING PLIERS AND USE OF A DIE HALF

(71) Applicant: WEZAG GmbH Werkzeugfabrik, Stadtallendorf (DE)

(72) Inventor: Thomas Glockseisen, Düsseldorf (DE)

(73) Assignee: WEZAG GmbH & Co. KG, Stadtallendorf (DE)

( * ) Notice: Subject to any disclaimer, the term of this patent is extended or adjusted under 35 U.S.C. 154(b) by 0 days.

(21) Appl. No.: 17/086,722

(22) Filed: Nov. 2, 2020

(65) Prior Publication Data

US 2021/0140840 A1 May 13, 2021

(30) Foreign Application Priority Data

Nov. 11, 2019 (EP) .................................... 19208363

(51) Int. Cl.
*G01L 5/00* (2006.01)
*B21D 39/04* (2006.01)
*H01R 43/042* (2006.01)

(52) U.S. Cl.
CPC .......... *G01L 5/0038* (2013.01); *B21D 39/048* (2013.01); *H01R 43/042* (2013.01)

(58) Field of Classification Search
CPC .... G01L 5/0038; B21D 39/048; H01R 43/042
See application file for complete search history.

(56) References Cited

U.S. PATENT DOCUMENTS

| | | | |
|---|---|---|---|
| 4,794,780 A | 1/1989 | Battenfeld | |
| 5,153,984 A | 10/1992 | Beetz | |
| 5,187,968 A | 2/1993 | Beetz | |
| 5,195,042 A | 3/1993 | Ferraro | |
| 5,490,406 A | 2/1996 | College | |
| 5,913,933 A | 6/1999 | Beetz | |
| 6,026,671 A | 2/2000 | Battenfeld | |
| 6,053,025 A | 4/2000 | Beetz | |
| 6,155,095 A | 12/2000 | Beetz | |
| 6,612,147 B2 | 9/2003 | Beetz | |
| 6,877,228 B2 | 4/2005 | Beetz | |
| 6,910,363 B2 | 6/2005 | Beetz | |

(Continued)

FOREIGN PATENT DOCUMENTS

DE 37 08 727 C2 7/1988
DE 40 14 221 A1 11/1990

(Continued)

OTHER PUBLICATIONS

Product catalogue "Werkzeuge fur die professionelle Anwendung" (publication No. 10/11) of the WEZAG GmbH Werkzeugfabrik company.

(Continued)

*Primary Examiner* — Max H Noori
(74) *Attorney, Agent, or Firm* — The Sladkus Law Group

(57) ABSTRACT

The invention relates to crimping pliers (1) having a pliers jaw (4) on which a die half (22) is supported. A crimping force biasing the die half (22) is sensed in the crimping pliers by a force sensor. The force sensor is a piezo foil (36) mounted to the pliers jaw. The force sensor senses the whole crimping force or only a crimping force component from which it is then possible to calculate the whole crimping force.

11 Claims, 6 Drawing Sheets

(56) References Cited

U.S. PATENT DOCUMENTS

| | | |
|---|---|---|
| 7,793,571 B2 | 9/2010 | Streuli |
| 8,113,031 B2 | 2/2012 | Battenfeld |
| 8,230,715 B2 | 7/2012 | Battenfeld |
| 8,296,956 B2 | 10/2012 | Battenfeld |
| 8,516,872 B2 | 8/2013 | Battenfeld |
| 8,601,856 B2 | 12/2013 | Battenfeld |
| 9,583,904 B2 | 2/2017 | Battenfeld |
| 9,634,451 B2 | 4/2017 | Battenfeld |
| 2008/0078255 A1 | 4/2008 | Ngo |
| 2014/0047885 A1 | 2/2014 | Battenfeld |
| 2014/0083149 A1* | 3/2014 | Wagner ............... H01R 43/042 72/31.01 |
| 2015/0251256 A1* | 9/2015 | Frenken ............. H01R 43/0428 100/234 |
| 2016/0078338 A1* | 3/2016 | Glockseisen ......... B25B 27/146 377/2 |
| 2016/0111840 A1* | 4/2016 | Battenfeld ........... H01R 43/042 72/409.14 |
| 2017/0239788 A1 | 8/2017 | Battenfeld |
| 2018/0040998 A1* | 2/2018 | Frenken .................... B25B 7/16 |
| 2018/0309256 A1* | 10/2018 | Glockseisen ...... H01R 43/0486 |
| 2018/0357028 A1* | 12/2018 | Glockseisen ........... B25B 15/00 |
| 2019/0314966 A1 | 10/2019 | Glockseisen |
| 2019/0363502 A1* | 11/2019 | Glockseisen ........ H01R 43/042 |
| 2020/0061785 A1 | 2/2020 | Glockseisen |
| 2021/0184412 A1* | 6/2021 | Glockseisen ............. B25B 7/22 |
| 2021/0336399 A1* | 10/2021 | Glockseisen ........ H01R 43/042 |

FOREIGN PATENT DOCUMENTS

| | | |
|---|---|---|
| DE | 40 23 337 C1 | 10/1991 |
| DE | 40 39 435 C1 | 6/1992 |
| DE | 40 26 332 C2 | 7/1992 |
| DE | 42 41 224 C1 | 1/1994 |
| DE | 43 37 796 A1 | 5/1995 |
| DE | 44 27 553 C2 | 6/1998 |
| DE | 298 03 336 U1 | 7/1998 |
| DE | 298 06 179 U1 | 10/1998 |
| DE | 198 02 287 C1 | 12/1998 |
| DE | 197 13 580 C2 | 12/1999 |
| DE | 198 32 884 C1 | 12/1999 |
| DE | 697 00 589 T2 | 5/2000 |
| DE | 198 07 737 C2 | 6/2000 |
| DE | 100 56 900 C1 | 8/2002 |
| DE | 197 53 436 C2 | 10/2002 |
| DE | 101 32 413 C2 | 7/2003 |
| DE | 102 42 345 B3 | 2/2004 |
| DE | 101 40 270 B4 | 9/2004 |
| DE | 10 2005 003 617 B3 | 6/2006 |
| DE | 10 2005 003 615 B3 | 9/2006 |
| DE | 199 32 962 A1 | 1/2008 |
| DE | 20 2008 003 703 U1 | 5/2008 |
| DE | 10 2007 038 626 B3 | 10/2008 |
| DE | 10 2007 050 176 A1 | 4/2009 |
| DE | 10 2008 003 524 B4 | 12/2009 |
| DE | 10 2008 012 011 B3 | 12/2009 |
| DE | 10 2010 061 148 A1 | 6/2012 |
| DE | 10 2004 009 489 B4 | 9/2013 |
| DE | 10 2008 030 773 A1 | 12/2013 |
| DE | 10 2011 052 967 B4 | 12/2013 |
| DE | 10 2015 107 302 A1 | 11/2016 |
| EP | 0 471 977 B1 | 6/1995 |
| EP | 0 873 582 B1 | 10/1999 |
| EP | 1 724 101 A1 | 11/2006 |
| EP | 2 043 818 B1 | 2/2010 |
| EP | 1 724 101 B1 | 2/2011 |
| EP | 2 305 428 A1 | 4/2011 |
| EP | 2 463 969 A2 | 6/2012 |
| EP | 2 672 580 A1 | 12/2013 |
| EP | 2 698 885 A1 | 2/2014 |
| EP | 2 562 891 B1 | 3/2016 |
| EP | 3 012 923 A1 | 4/2016 |
| EP | 3 012 924 A1 | 4/2016 |
| EP | 2 672 580 B1 | 2/2017 |
| EP | 3 208 044 A1 | 8/2017 |
| EP | 3 396 796 A1 | 10/2018 |
| EP | 3 553 900 A1 | 10/2019 |
| EP | 3 572 188 A1 | 11/2019 |
| EP | 3 614 507 A1 | 2/2020 |
| EP | 3 656 504 A1 | 5/2020 |

OTHER PUBLICATIONS

Publication "Crimptechnik, Herstellung prozesssicherer Verbindungen von elektrischen Leitem und Steckern" of the WEZAG GmbH Werkzeugfabrik company, Die Bibliothek der Technik 342, Verlag Modeme Industrie, ISBN 978-3-68236-027-7.

* cited by examiner

CRIMPING PLIERS, GROUP OF CRIMPING PLIERS AND USE OF A DIE HALF

CROSS REFERENCE TO RELATED APPLICATIONS

This application claims priority to co-pending European Patent Application No. EP 19 208 363.2 filed Nov. 11, 2019.

FIELD OF THE INVENTION

The present invention relates to crimping pliers wherein the crimping force being effective during a crimping process is measured by means of a force sensor. This might e. g. be done for monitoring the crimping process, for a quality assurance and/or for a documentation of the crimping process. Furthermore, the invention relates to a group of different crimping pliers. Finally, the invention relates to a use of a specific structural form of a die half.

Manually actuated crimping pliers of the present type serve for crimping a work piece (in particular for crimping a plug or connector to an electrical conductor). Generally, crimping pliers might be embodied according to the non-pre-published European patent application EP 16 156 231.9 (corresponding to US 2017/0239788 A1) or one of the publications EP 3 012 924 A1 (corresponding to U.S. Pat. No. 9,583,904 B2), EP 3 012 923 A1 (corresponding to U.S. Pat. No. 9,634,451 B2), EP 2 698 885 A1 (corresponding to US 2014/0047885 A1), EP 2 672 580 A1, EP 2 463 969 A2 (corresponding to U.S. Pat. No. 8,601,856 B2), DE 37 08 727 C2 (corresponding to U.S. Pat. No. 4,794,780 A), DE 40 23 337 C1 (corresponding to U.S. Pat. No. 5,153,984 A), DE 40 26 332 C2, DE 40 39 435 01 (corresponding to U.S. Pat. No. 5,187,968 A), DE 42 41 224 01, DE 44 27 553 C2, DE 197 13 580 C2 (corresponding to U.S. Pat. No. 5,913,933 A), DE 197 53 436 C2, DE 198 02 287 C1 (corresponding to U.S. Pat. No. 6,053,025 A), DE 198 07 737 C2 (corresponding to U.S. Pat. No. 6,026,671 A), DE 298 03 336 U1, DE 198 32 884 01 (corresponding to U.S. Pat. No. 6,155,095 A), DE 100 56 900 01 (corresponding to U.S. Pat. No. 6,612,147 B2), DE 101 32 413 C2 (corresponding to U.S. Pat. No. 6,877,228 B2), DE 101 40 270 B4, DE 102 42 345 B3 (corresponding to U.S. Pat. No. 6,910,363 B2), DE 10 2005 003 615 B3, DE 10 2005 003 617 B3, DE 10 2007 038 626 B3 (corresponding to U.S. Pat. No. 8,296,956 B2), DE 10 2008 003 524 B4 (corresponding to U.S. Pat. No. 8,113,031 B2), DE 10 2008 012 011 B3 (corresponding to U.S. Pat. No. 8,230,715 B2), DE 20 2008 003 703 U1, EP 1 724 101 A1, EP 2 305 428 A1 (corresponding to U.S. Pat. No. 8,516,872 B2), DE 10 2010 061 148 A1 (corresponding to U.S. Pat. No. 8,601,856 B2), DE 10 2011 052 967 B4 or corresponding to the manual crimping tools distributed by the applicant prior to the application date of the present patent application under the labels CS10, CSV10, CSV10-LWL, CSV10-FFC, AE, CS8, CK100, CS30, CS KTVR, CE/CG, CS150, CS200, CS210, CP600.

The crimping pliers in particular serve for producing a durable mechanical connection between the connector and the cable in the region of the insulation of the cable by means of an insulation crimp and on the other hand for a provision of a durable electrical contact between the connector and the electric conductor of the cable by means of a wire crimp. Depending on a profile of dies employed, with the crimping pliers different crimping processes can be executed.

For example, the crimp might be a closed crimp in which the conductor is inserted into a closed crimping zone of a plug or into a closed sleeve and is crimped by plastic deformation of the crimping zone or the sleeve. However, it is also possible that an open crimp is produced in which the plug comprises an open crimping zone into which the conductor can be inserted from above. To mention only some examples not limiting the invention, with the crimping pliers

- cable shoes or terminals according to German standard DIN 4623,
- aluminum connectors according to German standard DIN 46329,
- aluminum press-fit terminals according to German standard DIN 48201,
- crimp terminal or squeezing cable shoes according to German standard DIN 46234,
- pin terminals or pin cable shoes according to German standard DIN 46230 or
- connectors, plugs or terminals for a connection to a cable or conductor as described in the product catalog "Werkzeuge für die professionelle Anwendung" of WEZAG GmbH Werkzeugfabrik (publication no. 10/11)

can be crimped.

For a closed crimp the produced crimp may be a hexagonal crimp, a square crimp, a B crimp, a trapezoidal crimp, a modified trapezoidal crimp, an oval crimp, a mandrel crimp or a double mandrel crimp. An open crimp may e. g. be realized as a V crimp or B crimp, a rolled crimp or a double rolled crimp.

In addition to establishing the electric connection between cable and conductor and plug, a mechanical connection may be established by means of a so-called insolation crimp. Here, a closed insolation crimp or an open insolation crimp (especially a V crimp or B crimp, O crimp or OV crimp) may be employed. With regard to further information

- on a design of generic crimping pliers,
- on possible applications of generic crimping pliers and/or
- on different possible types of crimp connections which can be produced with the generic crimping pliers reference is made to the document

- "Crimptechnik, Herstellung prozesssicherer Verbindungen von elektrischen Leitern and Steckern" of WEZAG GmbH Werkzeugfabrik (Die Bibliothek der Technik 342, Verlag Moderne Industrie, ISBN 978-3-68236-027-7).

BACKGROUND OF THE INVENTION

The publication DE 10 2007 050 176 A1 describes that when crimping a connector to an electric conductor by use of crimping pliers a quality assurance on the basis of a monitoring of the crimping force is required due to the increasing complexity of cable harnesses, an aggravation of product liability and increased warranty demands. A force measuring device is proposed which can be embodied as a piezo-electric force sensor or as a strain gauge. The force measuring device is located on an outer side of a crimping punch or within the crimping punch or in a crimping accommodation. Furthermore, the crimping pliers comprise a transmitter which is arranged above the crimping plug on the crimping pliers head. The transmitter transmits a wireless crimping force signal which is received and processed by a receiving and processing device. The transmitter can be activated and deactivated by manipulation elements. Furthermore, by means of these manipulation elements it is possible to adjust the frequency of the transmitter under certain conditions. A power source embodied as an electric battery or a rechargeable accumulator is provided in the transmitter for the supply of power to the transmitter and the force measuring device. The publication also proposes that the transmitter might comprise an induction coil wherein an outer magnetic field induces an induction current for recharging the accumulator. It is also proposed to mount a photovoltaic cell to the crimping pliers for recharging the accumulator. Finally, the publication also proposes that a temporary cable connection is provided. The transmitter comprises a displaying device on which the crimping force, the transmitting frequency, the presence of a wireless connection, the loading state of the power source and the like can be displayed. The displaying device might be embodied as a LED- or LCD-displaying device. Additionally, a displacement measuring system for sensing the working stroke of the crimping pliers can be provided in the crimping pliers. For avoiding damages the crimping pliers might comprise a ratchet device or overload slipping device which limits the applicable crimping force to a given value. Furthermore, the publication proposes that the receiving and processing device might be embodied as a commercially available personal computer comprising a Bluetooth receiver.

The publication DE 298 06 179 U1 describes that it is known from DE 40 14 221 A1 to monitor the quality of the produced crimping connection in a crimping machine by sensing the crimping force. For this purpose the crimping punch, the crimping die or the sub-structure is an elastic body to which a strain gauge is mounted. The displacement of the crimping punch is sensed by a inductive displacement sensor. On this background the publication proposes to sense a crimping force and the crimping displacement also for crimping pliers. For this purpose a first force sensor is used which directly senses the crimping force in the bit of tongs. A second force sensor senses the opening displacement of the bit of tongs so that by means of the second force sensor the crimping displacement is indirectly sensed. Here, strain gauges or piezo-electric force sensors are used as the force sensors. Here, it is possible that a strain gauge is attached to a leaf spring which is tensioned during the closing movement of the crimping pliers. The publication also proposes that the first force sensor is attached to an intermediate part of the lever drive of the crimping pliers. A reference sensor can be used for allowing a temperature compensation. A processing circuit can be provided on the crimping pliers, the processing circuit comprising a suitable display for informing the user of the crimping pliers during the crimping process about the quality of the crimping process. It is also possible that the crimping pliers comprise a data storage wherein it is possible to store force-displacement-curves for different types of crimps (in particular for different types of contacts or plugs) so that for a specific crimp the associated force-displacement curve is available for the quality control. As an optical displaying device on the crimping pliers a display based on light-emitting diodes or a liquid crystal display can be used. Additionally, a signal can be output via an acoustic output device. If an optical displaying device consisting of light-emitting diodes or an acoustic output device is used, by means of the same the successful execution of the crimping process can be confirmed by different colors or sounds. As an interface for a stationary computer a cable-bound or optical interface or any possible interface transmitting via air which bases on electromagnetic radiation in the visible, infrared or RF-region for the date exchange can be used. Here, also a bi-directional interface can be used. It is also possible that the closing movement of the bit of tongs of the crimping pliers is supported by an electric servomotor. The monitoring of the crimping force curve can consist of a comparison of a measured crimping force curve with a predefined crimping force curve (in some cases with a predefined tolerance region).

The patent DE 10 2004 009 489 B4 lists the publications U.S. Pat. No. 5,195,042, DE 298 06 179, DE 199 32 962 and DE 697 00 589 as relevant prior art for the use of displacement-force-measurement systems in the crimping technology and relates to an electronic monitoring of an adjustment process of crimping pliers.

The patent application DE 10 2008 030 773 A1 lists the publications DE 40 14 221, DE 43 37 796, DE 199 32 962, DE 29 806 179.1 and U.S. Pat. No. 5,490,406 as relevant prior art with respect to known electronic devices for force-displacement-measurements in crimping pliers. Also this patent application DE 10 2008 030 773 A1 relates to the electronic monitoring of the process of adjusting the crimping pliers. Here, a sensor system is used which senses the crimping displacement in increments or by absolute measurements. It is possible that by a control unit, monitoring unit and processing unit an electronic image is generated at a LCD display. A cassette can be used into which a computer system as well as a constructional unit serving as the accommodating and adjusting device with the sensor system can be integrated. Constructional units can be assembled to and disassembled from completely assembled pliers allowing an exchange according to the needs.

The European patent EP 2 043 818 B1 (corresponding to U.S. Pat. No. 7,793,571 B2) proposes equipping manually actuated pliers with a signaling device which allows that the arrival at a predefined closing force can be sensed by the hand of the user. For this purpose, the signaling device is embodied as a vibrator integrated into one of the hand levers.

The publication EP 2 698 885 A1 (corresponding to US 2014/047885 A1) discloses a non-generic crimping machine wherein different exchangeable adaptors can be used. The exchangeable adaptors each comprise a punch and an anvil. Furthermore, in each of the exchangeable adaptors a sensor is integrated which senses a crimping force and/or a crimping displacement. Here, in the exchangeable adaptors sensors having different measurement regions are used for different applications. A force sensor can be integrated into a recess of the anvil or the punch of the exchangeable adaptor. A deformation of the anvil or the punch then leads to a bias of the sensor arranged in the recess with a force. In this case, the elastically deformable portions of the anvil or the punch are arranged in mechanical parallel arrangement to the support via the sensor. A calibration of the exchangeable adaptor and of the force sensors of the same can be done in the factory or after the delivery of the exchangeable adaptor. Determined calibration factors or calibration curves can then be modelled or stored in a control unit which is integrated into the exchangeable adaptor.

The publication EP 3 396 796 A1 (corresponding to US 2018/0309256 A1) proposes that in crimping pliers one die half is supported via a mechanical parallel arrangement on the one hand by a spring embodied as an elastomeric body and one the other hand by a force sensor. Accordingly, the force flow of the crimping force is divided into two force flow parts with two crimping force components. As a consequence the force sensor is not biased by the whole crimping force but only with a crimping force component which leads to decreased demands for the force sensor with respect to the maximum of the admissible force. Here, the force sensor bases on a (in particular semi-spherical) elastic calotte which is pressed by the crimping force component biasing the force sensor against a sensor surface. Here, the size or the diameter of the contact surface between the elastic calotte and the sensor surface depends on the crimping force component. The size of the contact surface is sensed by a series or matrix of contacts or switches arranged in the sensor surface. The number of the actuated contacts or switches correlates with the size of the contact surface. It is then possible to determine the crimping force component from the size of the contact surface sensed in this way on the basis of the deformation characteristic of the calotte and then to determine the crimping force from the a-priori known dependency of the crimping force component from the crimping force.

US 2008/0078255 A1 discloses a crimping machine comprising a die held by an anvil and a die held by a punch. The punch is guided by a frame of the crimping machine. In the anvil the crimping force biases a sensor device. In the sensor device a piezo-electric polymeric foil is sandwiched between two plates. Preferably, the piezo-electric polymeric foil comprises polyvinylidene fluoride (PVDF). The piezo-electric polymeric foil serves for measuring the crimping force during the crimping process executed by the machine. In order to avoid a misalignment of the dies or the punch and the anvil it is also possible that the force flow biases two piezo-electric polymeric foil elements arranged in mechanical parallel arrangement. According to US 2008/0078255 A1 it is intended to make the use for an assembly bolt (as required for force sensor embodied as sensor rings) dispensable by use of the piezo-electric polymeric foil. On the other hand, the use of the piezo-electric polymeric foil or of the polymeric foil elements aims for reducing an error source if the bias does not have an exact axial orientation and for avoiding a tilting and a bias with a bending moment as being the case for crystal or ceramic sensors.

Further prior art is known from DE 10 2015 107 302 A1.

SUMMARY OF THE INVENTION

The present invention proposes crimping pliers which comprise a pliers jaw. The pliers jaw might in particular be a fixed pliers jaw of the crimping pliers or a movable pliers jaw of the crimping pliers. A die half is supported on the pliers jaw. The crimping force biasing the die half is measured in the crimping pliers by means of a force sensor. Here, it is possible that the force sensor senses the whole crimping force or only a crimping force component from which it is then possible to calculate the whole crimping force (e. g. by use of a proportionality constant or dependent on the kinematic of the crimping pliers).

The invention proposes an alternative design of a force sensor which is in particular
  improved with respect to the constructional space properties and/or
  comprises an advantageous sensor principle and/or
  uses commercially available force sensor components.

Furthermore, proposes a group of crimping pliers which contain correspondingly improved crimping pliers. Finally, the invention proposes a die half that can be used in a multifunctional way.

The invention proposes that the force sensor comprises a piezo foil by means of which the crimping force (or the crimping force component) is measured. Piezo foils of this type can e. g. be commercially available so that these can be found in a simple way and also at reduced costs. Piezo foils comprise large sensor surfaces. Accordingly, dependent on the given size of the sensor surface it is possible to keep the contact pressure per unit area generated by the crimping force (or the crimping force component) sufficiently small. On the other hand, the piezo foils have a small extension in measuring direction and so in the direction of the effective crimping force. Accordingly, the use of the piezo foil in some cases results in a compact design of the force sensor and so of the crimping pliers, in particular with a small extension of the pliers jaw and the pliers head in the direction of the crimping force.

Piezo foils comprise piezo elements being distributed over the extension of the piezo foil. The piezo elements are manufactured as a foil. Here, a piezo element is a component using the piezo effect by generating an electric voltage under the bias by a mechanical force (here the crimping force or crimping force component). In piezo elements piezo crystals, piezo-electric ceramics or polycrystalline materials can be used. The piezo foil used according to the invention preferably might be a transparent film of a high-polarized polyvinylidene fluoride (PVDF) comprising outer surfaces coated by a metal. The electric charge generated by the biasing force is taken from the metallic coated outer surfaces and used as the sensor signal. Here, the piezo foil might be flexible or rigid. Preferably, the piezo foil has an extension in the direction of the effective crimping force of less than 100 μm, less than 70 μm, less than 50 μm, less than 30 μm, less than 20 μm or even less than 10 μm.

In the case that the piezo foil used according to the invention senses only a crimping force component from which then the whole crimping force is determined the crimping force can be transferred by use of a mechanical parallel arrangement on the one hand via the piezo foil and on the other hand via at least one elastomeric body or a different elastic supporting element. In this case the piezo foil is arranged in a first force flow part of the crimping force whereas the elastomeric body or the other elastic supporting element is arranged in the parallel force flow part. It is also possible that the elastic supporting element is arranged besides the or adjacent to the piezo foil or even integrated into the piezo foil.

According to the invention, the piezo foil is used in a force sensor unit. In the force sensor unit the piezo foil is sandwiched between a supporting body and a transfer body. Here, the supporting body is supported on the pliers jaw. Instead, at the transfer body the die half is supported (directly or indirectly). If it is intended that the piezo foil is only biased by a crimping force part, the branching of the force flow on the one hand to the piezo foil and on the other hand to the spring element arranged in parallel arrangement might take place within the force sensor unit. However, it is also possible that only a force flow part biases the force sensor unit and so the piezo foil whereas another force flow part bypasses the force sensor unit in the mechanical parallel arrangement.

According to the invention, the force sensor unit is not fixed to the pliers jaw. Instead, the invention proposes that the force sensor unit is mounted for being pivoted about a pivot axis to the pliers jaw. The pivot axis has an orientation vertical to the effective crimping force (and in particular vertical to a pliers head plane and to the pivoting plane of the hand levers or a pliers jaw of the crimping pliers). In this way the previously mentioned effects (of a more even distribution of the contact pressure biasing the piezo foil, of the provision of a constant orientation of the crimping force (part) biasing the piezo foil and/or of an increase of the maximum of the admissible crimping force) can be achieved or supported.

For another proposal of the invention, it is possible to exchange the die half. Generally, any mechanism for allowing the exchange is possible as being known from the prior art. For this embodiment it is possible that the die half comprises a die back. The die back is pressed with the crimping force or the crimping force component to the transfer body. In this case, it is possible that the transfer body (and the force sensor unit forming the transfer body) is not an exchangeable component of the crimping pliers. Here, the transfer body might provide a suitable transfer surface (or a kind of "interface" between the exchangeable die half and the not exchangeable force sensor unit). The die back of the exchangeable die half contacts the transfer surfaces and is pressed against the same by the crimping force or crimping force component. Preferably, the transfer surface of the transfer body forms a kind of interface to the exchangeable die half and so the interface to a plurality of die halves successively used with the crimping pliers. Here, the die back (and in a corresponding way also the transfer surface of the transfer body) might have a specific design for a good force transfer. Accordingly, it is e. g. possible that the die back (and/or the transfer surface of the transfer body) has been specifically ground or milled for providing the transfer without pressure peaks via the largest possible area. It is also possible that the die back (and/or the transfer surface of the transfer body) comprises a coating which is used for the exchangeable contact and for the transfer of the crimping force (part). It is e. g. possible that a coating of this type has a special hardness or resistance against wear or provides an elasticity for allowing a good adaptation on manufacturing tolerances of the die half and the die back.

A fixing of the (in some cases exchangeable) die half in the assembled state to the pliers jaw without any remaining degree of freedom (which is not covered by the invention) leads to the disadvantage that the orientation of the die halve of the crimping pliers changes in the case of pliers jaws which are pivoted relative to each other over the crimping stroke dependent on the opening angle of the pliers jaw. This might be disadvantageous for the contact of the die halves and the contact of the die contours defined by the die halves with the work piece and might lead to a deterioration of the crimping result. On the other hand, it is possible that due to the pivoting of the pliers jaws the orientation of the crimping force biasing the pliers jaw changes which leads to the result that a force sensor having a fixed orientation relative to the pliers jaw only senses a part of the component of the crimping force. The share of the part of the component in the crimping force varies over the crimping stroke which leads to a reduction of the measurement accuracy or requires an elaborate compensation of the dependency on the crimping stroke. Finally, the fixed assembly of the die half to the pliers jaw might lead to problems for the guidance of the force flow (part) of the crimping force via the force sensor.

For a particular embodiment of the inventive crimping pliers the die half is assembled by at least one mounting means with a play to the pliers jaw. Here, the assembly might provide a play in the direction of the effective crimping force. This embodiment provides that due to the play the crimping force is not transferred directly by the mounting means to the pliers jaw. Instead, despite of the mounting means due to the play the crimping force is (at least partially) supported via the force sensor and here the piezo foil. The at least one mounting means might in an extreme case only serve for securing the die half on the pliers jaw against getting lost.

It is alternatively or cumulatively possible that the play provides a pivoting degree of freedom of the die half relative to the pliers jaw. Accordingly, the die half is mounted by the at least one mounting means for being pivoted about a pivot axis on the pliers jaw. The pivot axis has an orientation vertical to the effective crimping force and in particular vertical to a pliers head plane and vertical to cover plates of the crimping pliers and/or vertical to a pivot plane of hand levers and/or of a pliers jaw of the crimping pliers. In some cases it is possible to provide by means of the pivoting degree of freedom that the crimping force (independent on the position in the crimping stroke) always biases the die half in one and the same direction and in particular vertical to the front face of the die half. On the other hand, the pivoting degree of freedom might also be advantageous for supporting the die half on the force sensor unit. In some cases, it might be disadvantageous for the force sensor unit if the crimping force does not bias the die back and the transfer surface along the surface normal because in this case the contact pressure per unit area between the die back and the transfer surface of the transfer body is not evenly distributed over the contact surface. An uneven distribution of the contact pressure per unit area leads to the result that sub-portions of the piezo foil are biased with pressure peaks which might lead to damages of the piezo foil or which might require a design of the force sensor and its integration into the crimping pliers for which the force peaks are below the admissible contact pressures in the piezo foil. However, this design leaded to a reduction of the maximum of the crimping force for which the inventive force sensor is usable.

It is possible that the die half is supported on the pliers jaw by mounting elements (in particular bolts or screws) with a floating support and the floating degree of freedom is reduced or removed by a contact of the die back of the die half with the transfer body of the sensor unit.

For the connection of the piezo foil to the supporting body and the transfer body there are a lot of options. It is e. g. possible that the piezo foil is loosely accommodated between the supporting body and the transfer body or clamped between the same. For one proposal of the invention the piezo foil is adhered to the supporting body and/or to the transfer body.

Within the frame of the invention it is possible that the die half and the force sensor unit are mounted to the movable pliers jaw. However, preferably the die half and the force sensor unit are supported on a fixed pliers jaw or on a fixed pliers body which forms the fixed pliers jaw.

The force sensor might itself comprise further electronic components which serve for processing, storing or transferring the force signal measured by the force sensor. For one proposal of the invention the force sensor is electrically connected to an electronic assembly unit which might serve for the aforementioned purposes. In order to mention only one non-limiting example the electronic assembly unit might embodied as described in the non-pre-published European patent application with the official application number EP 18 173 803, published as EP 3 572 188 A1 (corresponding to US 2019/0363502 A1) of the applicant. In this European patent application the electronic assembly unit is also denoted as "Tech-Pack". This European patent application is incorporated by reference into the present patent application in particular with respect to
- the design of the electronic assembly unit,
- the integration of the electronic assembly unit into the crimping pliers,
- the processing methods executed on the electronic assembly unit and
- the functions provided by the electronic assembly unit.

For this embodiment the crimping pliers comprise a mechanical pliers part by which the general mechanic crimping function is provided and which comprises the mechanical components as the hand levers pivoted relative to each other, the pliers jaws and a drive mechanism coupling the hand levers to the pliers jaws. An electronic assembly unit is formed separately from the mechanical pliers part. The electronic assembly unit is attached on at least one side of the pliers head of the crimping pliers to the mechanical pliers part and held by the same. Preferably, the electronic assembly unit extends on two opposite sides of the pliers head. Here, single components of the electronic assembly unit (as e. g. two circuit board parts) can be each arranged on one side of the pliers head and can be connected to each other by a connecting cable extending partially around the mechanical pliers part. Here, the electronic assembly unit might comprise two half-shell-like housing parts which in the assembled state extend in a closed fashion in circumferential direction about the mechanical pliers part. The electronic assembly unit might also comprise a housing which has a sub portion being transparent or translucent. In this case, a lamp can be arranged within the housing. The lamp is arranged such that and has an orientation such that light emitted by the lamp biases the transparent or translucent sub portion. The electronic assembly unit might comprise a battery or an accumulator for the supply of power. The battery or accumulator might also be integrated into one of the hand levers. The electronic assembly unit might serve for additional purposes and contain the components required for these purposes. Without a limitation of the invention to this example, the electronic assembly unit might comprise a GPS unit for allowing a determination of the localization of the crimping pliers. It is possible that by means of the electronic assembly unit the number of passed working strokes is determined or processed. The electronic assembly unit might serve for analyzing the crimping process, for a storing of sensor data, for a securing against theft, for an acoustic output, for an electronic insertion control for controlling the correct insertion of a workpiece into the die of the crimping pliers and the like. With respect to further details reference is made to the non-pre-published European patent application with the official application number EP 18 173 803, published as EP 3 572 188 A1 (corresponding to US 2019/0363502 A1).

It is generally possible that in the inventive crimping pliers only the crimping force is sensed. Within this frame there might only be a sensing, processing or storing of single values of the crimping force (as e. g. the maximum). However, it is also possible that crimping force curves are measured dependent on the time. For one particular proposal of the invention in the crimping pliers additional to the force sensor also a displacement sensor is provided which senses a displacement of a component of the drive mechanism of the crimping pliers (which also covers the displacement of a hand lever and/or a pliers jaw) over the crimping stroke. By the displacement sensor it is then e. g. possible to analyze how many working strokes the crimping pliers have run through. Accordingly, it is e. g. possible to exchange a die or the whole crimping pliers when reaching a predetermined number of working strokes that have been executed. On the other hand, it might be important for the process documentation and the monitoring of the process to sense and analyze the crimping force dependent on the displacement (here on the passing of the crimping stroke). It is e. g. possible to compare a crimping force for a given crimping displacement or also to compare curves of the crimping force over the crimping displacement with given desired values or desired curves and then determine on the basis of this comparison if the crimping process has been executed according to the specifications.

Another aspect of the invention relates to a specific design of a die half. According to this proposal a die half is used which comprises two die half parts. Here, one die half part might serve for providing the insulation crimp (so the mechanical connection of the connector with the insulation of the electrical wire) and the other die half part might serve for providing the wire crimp (so the provision of the electric connection of the connector to the electrical wire). The two die half parts are then connected to each other by at least one transverse bolt. The transverse bolt protrudes on both sides from the die half parts. This transverse bolt is then not necessarily used (as in the prior art) for rigidly supporting the die half on the pliers jaw. Instead, according to the invention between the transverse bolt and the pliers jaw a play in the direction of the effective crimping force is established. This play leads to the consequence that the crimping force is not directly transferred from the die half via the transverse bolt to the pliers jaw which would lead to the result that the crimping force would not bias the force sensor. Instead, the play provides that at least a component of the crimping force biases the force sensor and can be measured by the same.

With respect to the equipment of the die halves with a transverse bolt of this type reference is in particular made to the patent publication DE 198 02 287 C1 of the applicant which is incorporated by reference into the present patent application. The die halves described in this patent publication comprise a die portion protruding from the pliers jaw and a flange portion arranged within the pliers jaw. The flange portion and the pliers jaw comprise aligned bores through which a bolt or a screw extends for holding the die half at the pliers jaw. Furthermore, the die half comprises two parallel transverse bores in the transition region between the die portion and the flange portion. Parallel transverse bolts extend through the parallel transverse bores. The transverse bolts can be fixed in the transverse bores by a press fit. Whereas according to DE 198 02 287 01 the free end regions of the transverse bolts are accommodated in accommodations of the pliers jaws which have a cross section with an open edge (in particular half cylindrical openings), according to the invention a play is formed between these transverse bolts and the (in particular half cylindrical) accommodations of the pliers jaws.

For another proposal of the invention another die half is held at the pliers jaw of the crimping pliers. Also this other die half comprises two die half parts. The two die half parts are also connected by at least one transverse bolt to each other, the transverse bolt protruding on both sides from the die half parts of the other die half. However, between the transverse bolt and the other pliers jaw no play in the direction of the effective crimping force is established. Preferably the other die half is supported at the other pliers jaw by the at least one transverse bolt directly and without any play in the previously mentioned half cylindrical accommodations of the other pliers jaw as described in the patent publication DE 198 02 287 C1. Accordingly, due to the aforementioned play between the first die half and the associated pliers jaw the force flow (part) from the die half via the force sensor to the pliers jaw can be provided whereas for the other pliers jaw the crimping force is directly transferred from the die half to the pliers jaw.

Another solution of the object of the invention is given by a group of crimping pliers. For this proposal of the invention two different group parts of crimping pliers are provided:

Crimping pliers of a first group part comprise two die halves each comprising two die parts which (as explained above) are each connected to each other by at least one transverse bolt protruding on both sides from the die half parts. For the crimping pliers of the first group part the crimping force is directly supported without any play at the associated pliers jaw via the transverse bolts of the two die halves. In this case, there is no force flow via another path and in particular via a force sensor so that preferably the crimping pliers of the first group part do not comprise a force sensor.

Instead, the crimping pliers of the second group part are embodied as explained above so that in this case one die half is directly supported by the associated transverse bolt on the pliers jaw whereas due to the play between the die half and the pliers jaw the other die half is supported via the force sensor.

Preferably, it is possible to use a large number of same components for the crimping pliers of the two group parts which leads to a reduction of the expenditure in manufacturing and the effort for storing the components. This is the case despite of the crimping pliers of the first group part being embodied without a force sensor and the crimping pliers of the second group part comprising a force sensor.

Another solution of the object of the invention is given by a particular use of a die half comprising two die half parts which are connected to each other by at least one transverse bolt. The transverse bolt protrudes on both sides from the die half parts. The die half comprises a back surface having an orientation transverse to the crimping force. According to the invention it is possible to use the die half in a multifunctional way for a first use or for a second use:

For a first use the die half is used for crimping pliers wherein the transverse bolt is supported without any play in the direction of the effective crimping force on the associated pliers jaw so that the crimping force can be transferred by the transverse bolt whereas no crimping force is transferred via the back surface. Preferably, for the first use the die half is used in crimping pliers wherein no force sensor is used, or used for a pliers jaw on which no force sensor is supported.

However, the same die half can also be used in a second use for crimping pliers wherein the transverse bolt and the pliers jaw establish a play in the direction of the effective crimping force. In this case the transverse bolt does not transfer a crimping force to the pliers jaw. Instead, the crimping force or the crimping force component is transferred by the back surface. Due to the inventive multifunctional usability of the die half the die half can be manufactured, stored and/or distributed independent on its use with a pliers jaw equipped with a force sensor or with a pliers jaw on which no force sensor is supported and where the crimping force is directly transferred from the die half to the pliers jaw.

Advantageous developments of the invention result from the claims, the description and the drawings.

The advantages of features and of combinations of a plurality of features mentioned at the beginning of the description only serve as examples and may be used alternatively or cumulatively without the necessity of embodiments according to the invention having to obtain these advantages.

The following applies with respect to the disclosure—not the scope of protection—of the original application and the patent: Further features may be taken from the drawings, in particular from the illustrated designs and the dimensions of a plurality of components with respect to one another as well as from their relative arrangement and their operative connection. The combination of features of different embodiments of the invention or of features of different claims independent of the chosen references of the claims is also possible, and it is motivated herewith. This also relates to features which are illustrated in separate drawings, or which are mentioned when describing them. These features may also be combined with features of different claims. Furthermore, it is possible that further embodiments of the invention do not have the features mentioned in the claims which, however, does not apply to the independent claims of the granted patent.

The number of the features mentioned in the claims and in the description is to be understood to cover this exact number and a greater number than the mentioned number without having to explicitly use the adverb "at least". For example, if an transverse bolt or a piezo foil is mentioned, this is to be understood such that there is exactly one transverse bolt or one piezo foil or there are two transverse bolts or two piezo foils or more transverse bolts or piezo foils. Additional features may be added to these features, or these features may be the only features of the respective product.

The reference signs contained in the claims are not limiting the extent of the matter protected by the claims. Their sole function is to make the claims easier to understand.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
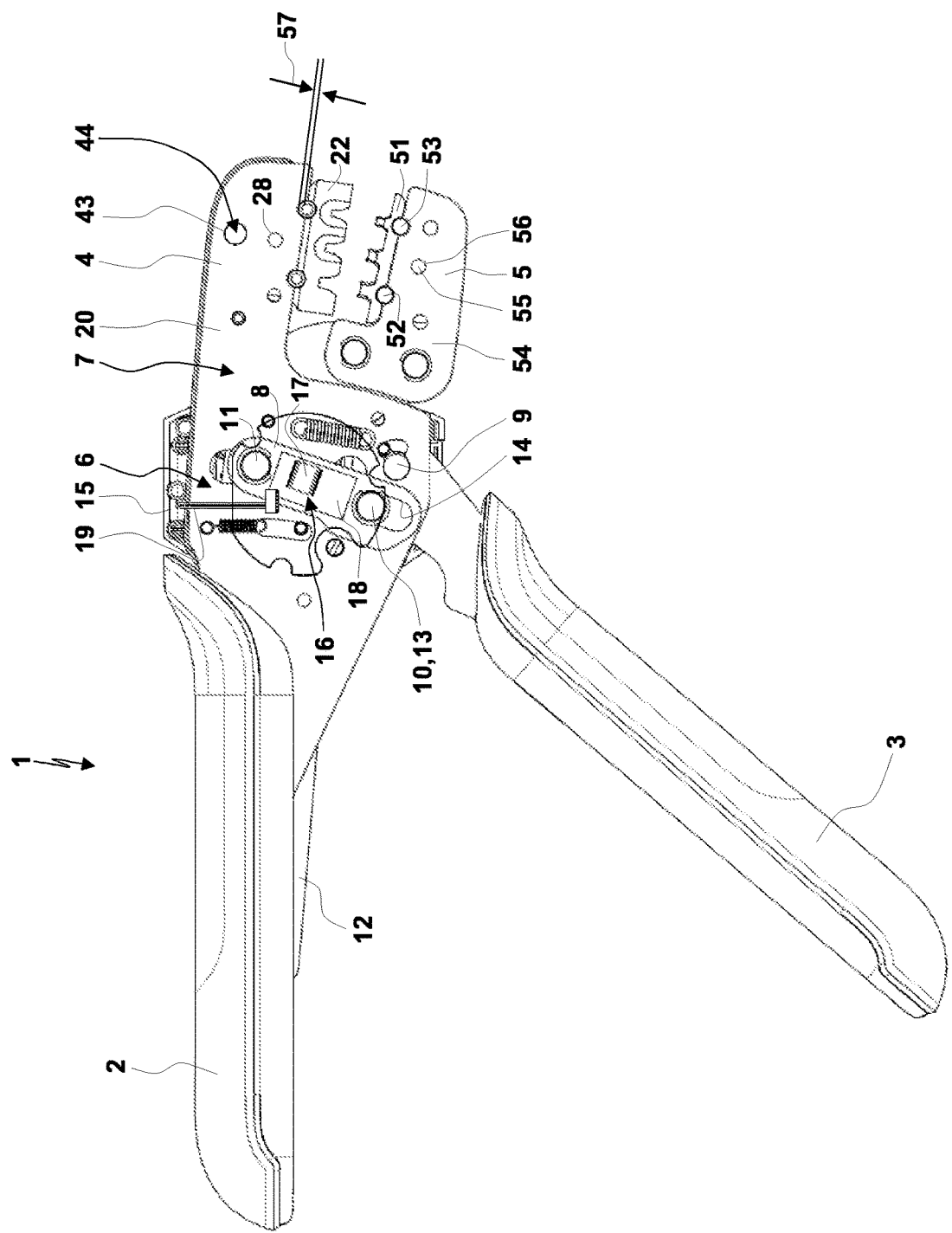
FIG. 1 in a side view shows crimping pliers in an open state.
Figure 2:
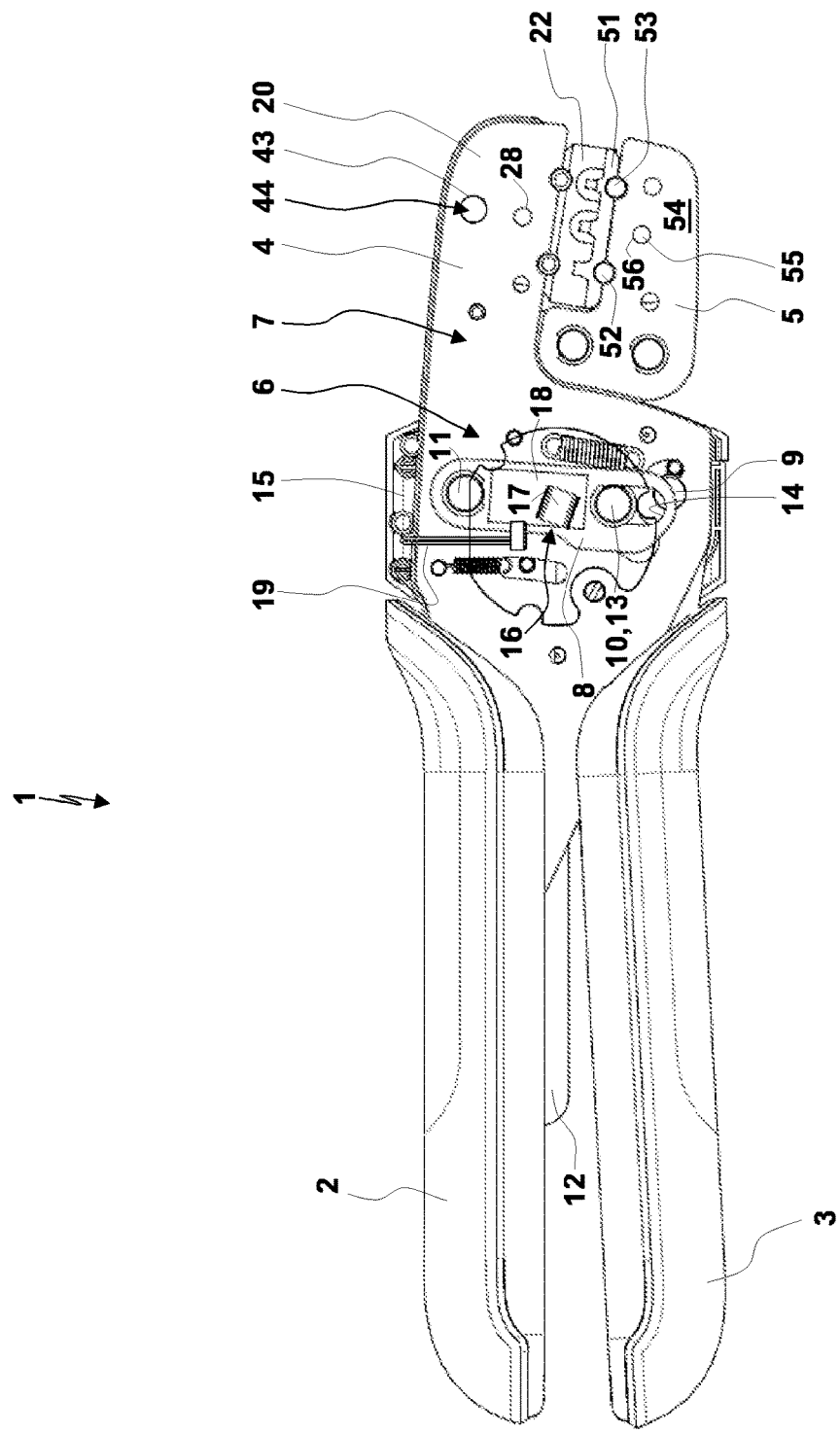
FIG. 2 in a side view shows the crimping pliers of FIG. 1 in a closed state.
Figure 3:
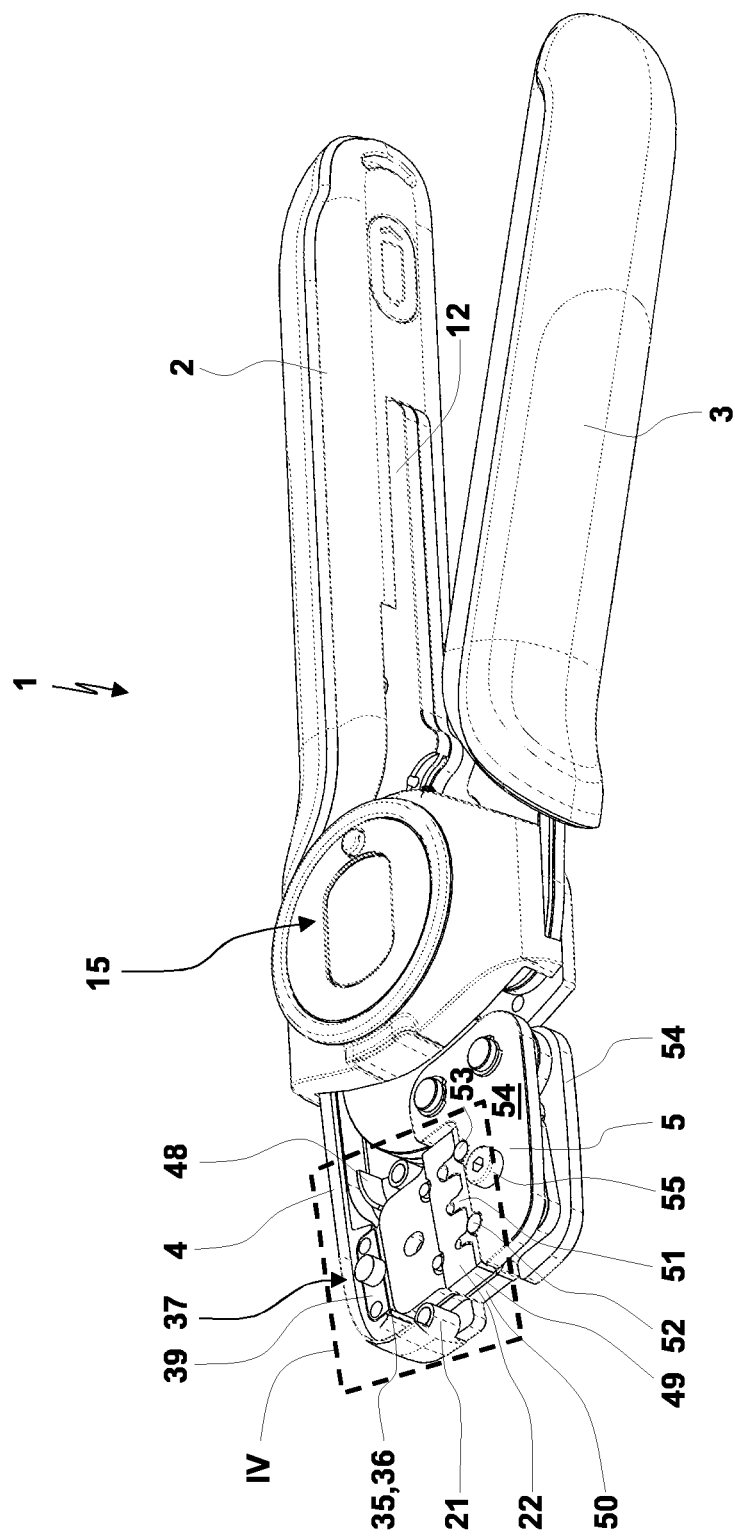
FIG. 3 in a three-dimensional view shows the crimping pliers of FIGS. 1 and 2, here with a disassembled cover plate of the pliers head.
Figure 4:
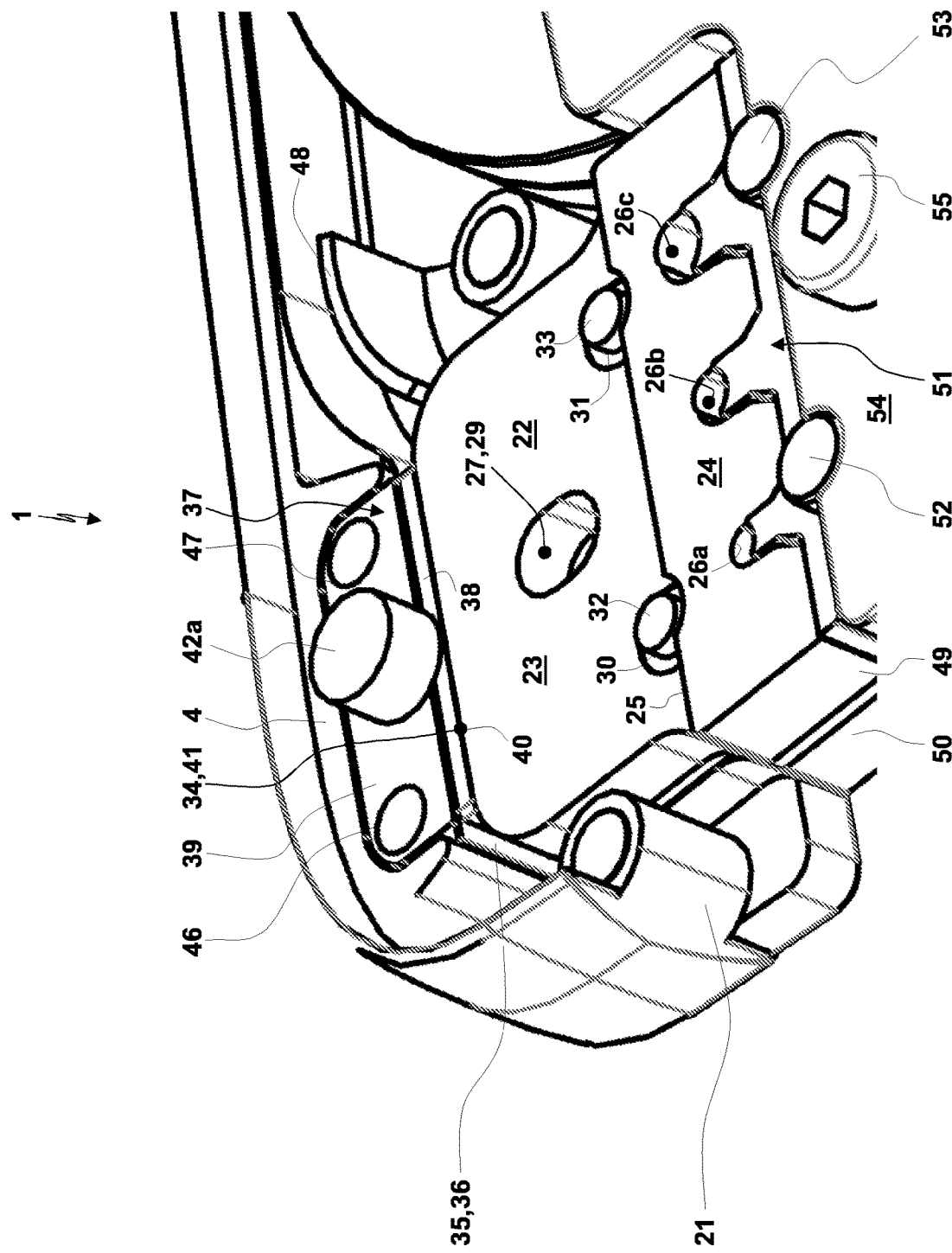
FIG. 4 in a detail IV shows the crimping pliers of FIG. 3.

FIGS. 1 to 4 show crimping pliers 1, an electronic assembly unit 15 being partially disassembled. The crimping pliers 1 comprise a fixed hand lever 2 and a movable hand lever 3 as well as a fixed pliers jaw 4 and a movable pliers jaw 5. The hand levers 2, 3 are coupled by a drive mechanism 6 to the pliers jaws 4, 5. The drive mechanism 6 transfers a closing movement of the hand lever 2, 3 from an open position in FIG. 1 to the closed position in FIG. 2 via a crimping stroke into a closing movement of the pliers jaws 4, 5. In particular, the drive mechanism 6 comprises a toggle lever drive. Furthermore, the drive mechanism 6 might comprise a so called forced locking unit. By means of the forced locking unit it is possible to secure a crimping stroke part once induced against an undesired opening also when (at least partially) removing the hand forces applied to the hand levers 2, 3 and/or to provide that a reopening of the hand levers 2, 3 and the pliers jaws 4, 5 is only possible when arriving at a predetermined closed position at the end of the crimping stroke. Preferably, the fixed hand lever 2 and the fixed pliers jaw 4 are components or portions of a fixed pliers body 7 to which the movable pliers jaw 5 and a pressure lever 8 are linked for being pivoted.

It is possible that the movable hand lever 3 is linked for being pivoted by a pivot bearing 9 to the fixed pliers body 7. At a position remote from this pivot bearing 9 the movable hand lever 3 is connected by another pivot bearing 10 to the pressure lever 8. The pressure lever 8 is linked in another end region by means of a pivot bearing 11 to the movable pliers jaw 4. The pivot bearings 9, 10, 11 form the pivot bearings of a toggle lever drive. When approaching the closed position of FIG. 2 the toggle lever drive approaches the extended state or straight state.

Furthermore, it is possible that the crimping pliers 1 comprise another hand lever 12 which partially extends within the fixed hand lever 2 and which is fixedly connected to the fixed pliers jaw. An actuation of the hand lever 12 towards the hand lever 2 induces that the pliers jaws 4, 5 are transferred from the starting position into an (extended) open position without a change of the relative position of the hand levers 2, 3. The (extended) open position can be used for inserting the workpiece into the bit of tongs. When removing the force applied to the hand lever 12 a spring returns the third hand lever 12 back into the starting position. Simultaneously, the pliers jaw 5 returns into the starting position or before arriving in the starting position a workpiece is clamped in the bit of tongs. In order to allow this movement of the pliers jaw 5 by an actuation of the hand lever 12 into the extended open position the pivot bearing 10 of the pressure lever 8 comprises a degree of freedom. For the shown embodiment the degree of freedom is provided by the guidance of a pivot pin 13 of the pivot bearing 10 in an elongate hole 14 of the pressure lever 8. On the other hand, the crimping pliers 1 might also be equipped with an opening spring which when arriving at the closed position automatically returns the crimping pliers 1 back into the starting position or open position. The provision of the starting position, the generation of a closing force from the extended open position into the starting position and the generation of an opening force from a closed position into the starting position might be provided by an interaction of the springs with suitable stops. Here, due to the stops the springs only become effective in a stroke part (namely on the one hand side in the stroke part between the starting position and the closed position and on the other hand side in the stroke part between the starting position and the extended open position).

With respect to the design of the toggle lever drive and of the mechanical pliers part, the provision of the starting position, the integration of the third hand lever 12 into the crimping pliers 1, the different springs and the stops of the guidance of the pivot bolt 13 in the elongate hole 14 reference is made to the not pre-published European patent application with the official application number EP 18 190 465, published as EP 3 614 507 A1 (corresponding to US 2020/0061785 A1) which is incorporated by reference into the present patent application.

An electronic assembly unit 15 or a "Tech-Pack" is fixed to the mechanical pliers part with the mechanical components being responsible for inducing the actual crimping process and the opening of the crimping pliers. Here, the electronic assembly unit 15 is arranged in the region of the pliers head and in a section between the bit of tongs and the hand levers 2, 3. The electronic assembly unit preferably extends ring-shaped around the mechanical pliers part in the region of the pliers head. The electronic assembly unit 15 might comprise an electronic control unit, an input element as a switch, sensor, push button and the like, an output element or a display, a light, an acoustic output element or a sensor. The sensor might in particular be a displacement sensor 16. For the shown embodiment the displacement sensor 16 comprises a first sensor element 17 (in particular a circuit board) arranged at the housing of the electronic assembly unit 15 and a second sensor element 18 held at the pressure lever 8. In this case, the displacement sensor 16 senses the relative movement of the sensor element 17, 18 over the crimping stroke. Preferably, on each of the opposite sides of the mechanical pliers part a circuit board (part) is arranged. The two circuit board or circuit board parts are then connected to each other by a connecting cable 19. The electronic assembly unit might comprise two half-shell-like housing parts which in the assembled state extend in a closed fashion in circumferential direction about the mechanical pliers part. The housing of the electronic assembly unit 15 might comprise a sub-portion being transparent or partially transparent for light. In this case, a lamp can be arranged within the housing. The lamp is arranged and oriented such that light emitted by the lamp biases the transparent or partially transparent sub-portion and at least partially passes through the sub portion. The electronic control unit might comprise control logic which analyzes the loading state of a battery or accumulator, determines or analyzes a number of passed working strokes and evaluates a working process executed by the pliers tool, stores data, in a standby modus activates a ready for use modus when detecting a movement of the crimping pliers 1 by an acceleration sensor, deactivates a display or lamp when detecting that the crimping pliers have not been actuated for a given first time span or for a given second time span, the first time span possibly being longer than the second time span, operates a wirelessly transmitting and/or receiving device, displays the loading state of a battery of an accumulator by means of a lamp, allows a configuration of the crimping pliers 1 by transferring or loading operational parameters, allows the sensing of the arrival at a closed position of the hand levers 2, 3, allows the control of a locating function for determining the location of the crimping pliers 1, allows to control an anti-theft system of the crimping pliers by taking the crimping pliers out of function, allows to control an acoustic output of the crimping pliers 1, allows to perform an electronic insertion control for controlling the insertion of a workpiece into the bit of tongs according to the specifications and/or allows to generate an image at a display which might be a name or a label of a manufacturer, an owner or a user, a loading state of a battery or an accumulator, a measured crimping force, a measured crimping displacement or a curvature of the same, the number of passed working strokes, the result of an analysis of the crimping process executed with the crimping pliers 1 and/or an indication that a maintenance of the crimping pliers 1 is required or correlates therewith. With respect to the design of the electronic assembly unit, the interaction with the mechanical pliers part of the crimping pliers 1 and the functions provided by the electronic assembly unit reference is made to the European patent application with the official application number EP 18 173 803, published as EP 3 572 188 A1 (corresponding to US 2019/0363502 A1) which is incorporated by reference into the present patent application.

Furthermore, it is possible that via the electronic assembly unit the crimping pliers 1 wirelessly communicate with an external electronic control unit (in particular a smartphone or a computer arranged in the working environment of the crimping pliers). It is additionally possible that this external electronic control unit again communicates with a cloud storage unit. These communication paths can in particular be used for a documentation of the crimping processes, of the used dies, of the crimping force curves and/or the crimping displacements, of the number of the crimping strokes executed by the crimping pliers or a die and the like. It is also possible that the electronic assembly unit or the crimping pliers comprise a capturing device configured for capturing a characteristic feature or label of the die half/halves. The capturing device might be arranged adjacent to the die half. The capturing device might be a reading device for reading an identification embodied as an optical coding of a die half, might be a mechanical capturing device for capturing a mechanical contact contour of the die half, a receiving unit for receiving an identification from a RFID-unit of the die half or a capturing device for an identification by means of an inductive coupling between the die half and the capturing device. The identification of the die half might be an identification of the type of the die half, a specific identification of the die half and/or an authentication of the die half. It is possible that by means of the aforementioned communication paths after the capturing of an identification of a die half a list of workpieces that can be crimped with the captured die half is generated. These types of workpieces can then be displayed at a display of the crimping pliers or at the external electronic control unit. It is also possible that additional to the capturing of the die half by the identification also a type of a workpiece (e. g. by use of an image recognition on the basis of the picture of a camera) is captured. In this case, by means of the control logic of the electronic assembly unit 15 and/or of the external electronic control unit it is checked if the captured die half is suitable for crimping the captured type of the workpiece which can then be brought (optically or acoustically at the crimping pliers or at the external electronic control unit) to the attention of the user. With respect to this and other design options of the capturing device for an identification of a die half and the communication of the crimping pliers with an external electronic control unit and in some cases via the external electronic control unit with a cloud storage unit and options for evaluating and determining suitable combinations of die halves and workpieces reference is made to the European patent application with the official application number EP 18 207 344, published as EP 3 656 504 A1 (corresponding to US 2019/0363502 A1) which is incorporated by reference into the present patent application.

Preferably, the aforementioned constructional elements of the crimping pliers 1 respectively of the mechanical pliers part of the crimping pliers 1 are designed in a plate design wherein these constructional elements might also be embodied by a plurality of plates arranged parallel to each other.

The fixed pliers jaw and here also the fixed pliers body 7 comprises two (here metallic) cover plates 20 arranged parallel to each other with a distance from each other. In the front end region of the fixed pliers jaw 4 the distance of the cover plates 20 is defined by a longitudinal extension of a sleeve 21 through which the cover plates 20 are screwed, bolted or pinned to each other. In the interspace between the cover plates 20 a die half 22 is accommodated with a play in a direction vertical to the pivoting plane of the pliers jaw 5, the play allowing a relative movement.

The die half 22 comprises a flange portion 23 which when inserting the die half 22 into the crimping pliers 1 extends between the cover plates 20. Furthermore, the die half 22 comprises a die portion 24. The transition of the flange portion 23 to the die portion 24 might be provided by a step 25. In the die portion 24 the die half 22 forms at least one die contour 26 (here three die contours 26a, 26b, 26c arranged one besides the other and having different geometries for different workpieces). A through recess 27 is provided in the flange portion 23. When aligning the through recess 27 to the associated fixing bore 28 of the cover plates 20, it is possible to fix the die half 22 at the cover plates 20 by a bolt, a pin or a screw under the provision of a securing against getting lost. From reasons explained more in detail in the following the through recess 27 is embodied as an elongate hole 29. In the end region of the flange portion 23 facing towards the die portion 24 or in the region of the step 25 the die half 22 comprises two parallel through bores 30, 31. Transverse bolts 32, 33 extend through the through bores 30, 31. The transverse bolts 32, 33 are in particular fixed by a press fit or in another way in the through bores 30, 31. On both sides the transverse bolts 32, 33 protrude from the flange portion 23.

The die half 22 comprises a die back 34. The die back 34 comprises a surface normal having a direction corresponding to the direction of the crimping force. For the shown embodiment the die back 34 is formed by the front face of the flange portion 23 facing away from the die portion 24. However, a die back might also be formed by a corresponding step of the die half 22.

The crimping pliers 1 furthermore comprise a force sensor 35 comprising a piezo foil 36 or consisting of the same. The force sensor 35 is a component of a force sensor unit 37. In the force sensor unit 37 the piezo foil 36 is sandwiched between a transfer body 38 and a supporting body 39. Preferably, the piezo foil 36 is adhered to the transfer body 38 and the supporting body 39.

The transfer body 38 has a plate design. Preferably, the transfer body 38 has an extension in the direction of the effective crimping force of 1.0 mm±40%, ±30%, ±20% or ±10%. On the side facing towards the die half 22, the transfer body 38 forms a plain transfer surface 40. A back surface 41 formed by the die back 34 is pressed with the crimping force to the transfer surface 40 of the transfer body 38.

Figure 5:
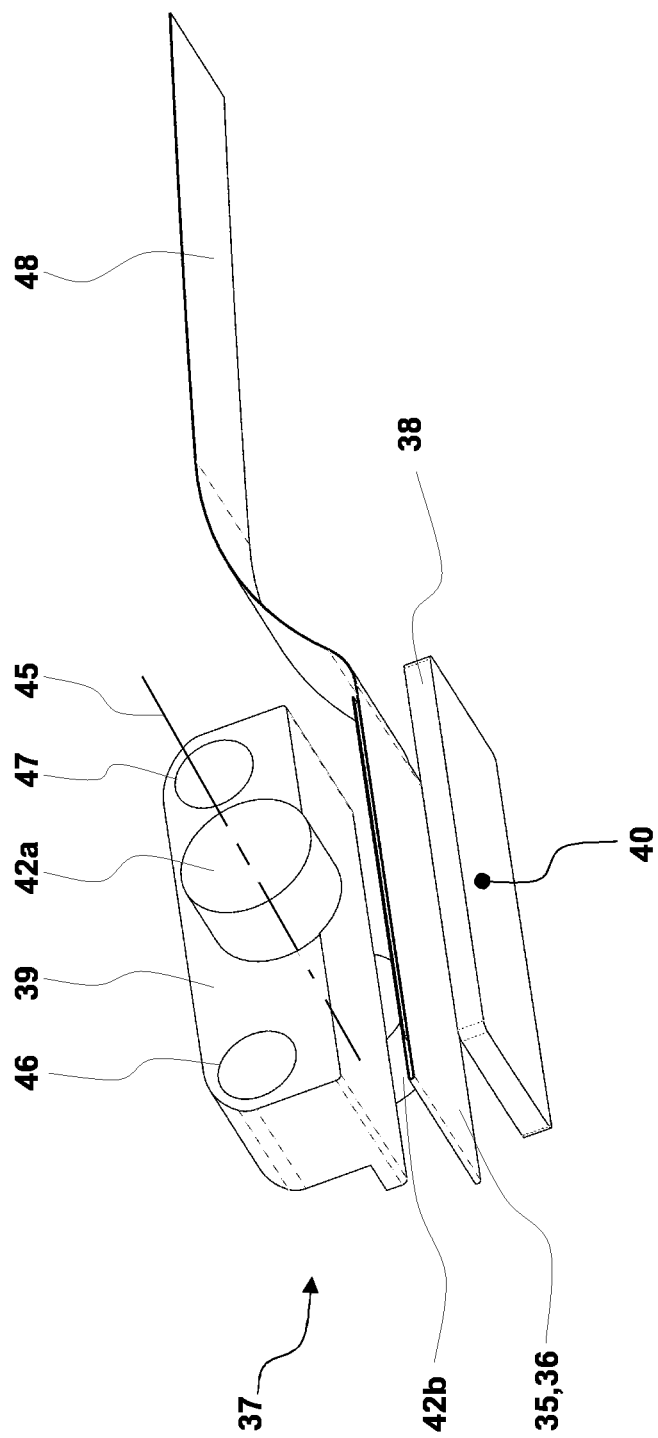
FIG. 5 in a three-dimensional exploded view shows a force sensor unit used in the crimping pliers of FIGS. 1 to 4.

On both sides the supporting body 39 comprises pivot pins 42a, 42b having an orientation transverse to the crimping force and to the pivot plane of the pliers jaw 5 (cp. FIG. 5). The pivot pins 42a, 42b are each accommodated in a bearing lug 43 of the cover plates 20. In this way a pivot bearing 44 is formed. By means of the pivot bearing 44 the supporting body 39 is supported for being pivoted about a pivot axis 45 defined by the pivot pins 42 on the cover plates 20. By the pivot bearing 44 the position of the pivot axis 45 of the supporting body 39 is fixed relative to the cover plates 20. Optionally, the supporting body 39 might comprise another bore 46, 47 remote from the bearing lug 43. Bolts or pins might extend through the bores 46, 47. By means of the bolts or pins it is possible to limit the pivoting movement of the supporting body 39 about the pivot axis 45 in one direction or in both directions. This is provided by the abutment of the bolts or pins extending through the bores 46, 47 on stops of the cover plates 20.

It is possible that the piezo foil 36 is connected by a connecting cable 48 to the electronic assembly unit 15. By means of the electronic assembly unit 15 a signal processing and an analysis of the signal of the piezo foil 36 and so a determination of the crimping force can be provided.

Figure 6:
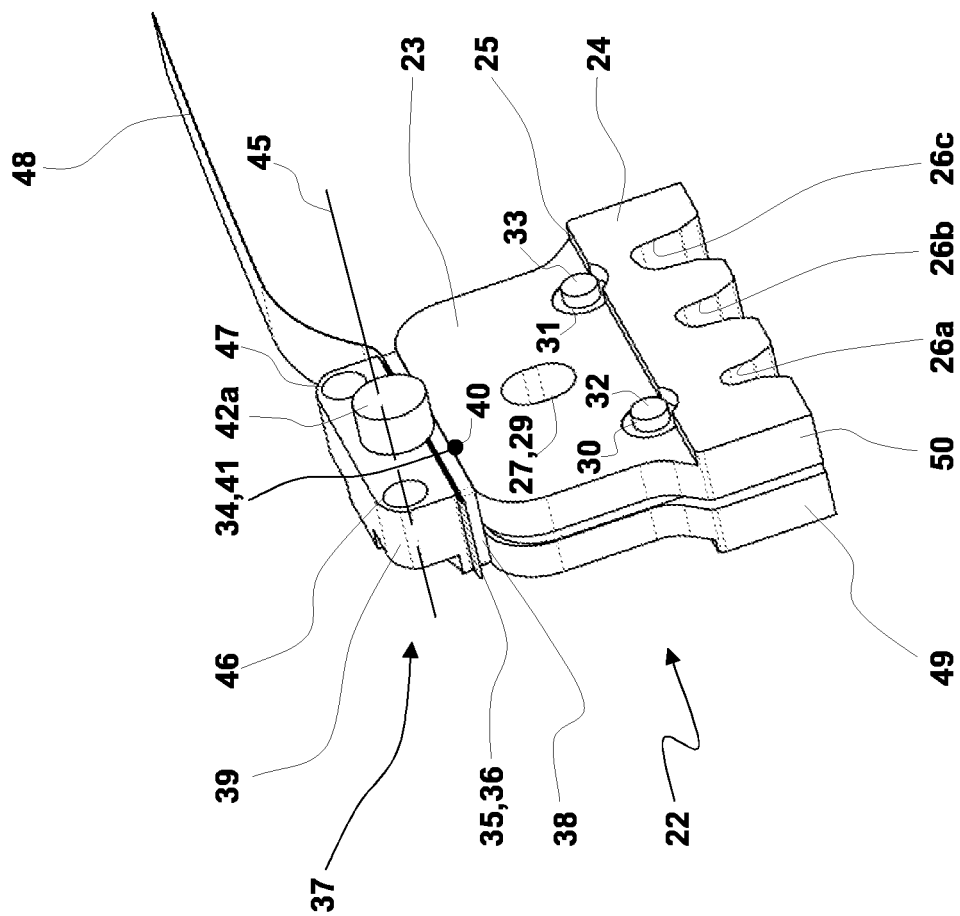
FIG. 6 in a three-dimensional view shows a die half and a die half which can be used in crimping pliers of FIGS. 1 to 4.

For the embodiment shown here the die half 22 comprises two plate-shaped die half parts 49, 50 (cp. FIG. 6). Here, one die half part 49 forms the die contour for the insulation crimp whereas the other die half part 50 forms the die contour for the wire crimp. The press fit of the transverse bolts 32, 33 with the through bores 30, 31 serves for providing a fixed connection of the die half parts 49, 50 with each other.

The die half 22 interacting with the force sensor unit 37 and being supported by the fixed pliers jaw 4 when running through the crimping stroke interacts with the other die half 51 held at the other pliers jaw 5. The die contours of the die halves 22, 51 together form a die wherein the workpiece is crimped. Also the die half 51 comprises transverse bolts 52, 53. A flange portion of the die half 51 is accommodated between pliers jaw plates 54 of the pliers jaw 5. The pliers jaw plates 54 form (preferably half-cylindrical) accommodations for the transverse bolts 52, 53 wherein the die half 51 is directly supported with the crimping force on the pliers jaw plates 54 and so on the pliers jaw 5. Additionally, the die half 51 is fixed by means of a fixing screw or a bolt 55 which extends through aligned bores 56 of the pliers jaw plates 54 and the die half 51.

The pivot axis 54 and the pivot pins 42*a*, 42*b* of the supporting body 39 are arranged and supported on the cover plates 20 in a way such that when supporting the die half 22 on the force sensor unit 37 the protruding end regions of the transverse bolts 32, 33 are arranged with a play 57 relative to the cover plates 22 (in particular with a play 57 relative to the half-cylindrical accommodation of the same).

The crimping pliers 1 with the force sensor unit 37 function as follows: When inserting the die half 22 between the cover plates 20 the die back 34 of the die half 22 contacts the transfer surface 40 of the transfer body 38 with the back surface 41. Here, the transverse bolts 32, 33 are not supported on the cover plates 22. Instead, in the direction of the effective crimping force there is only a support of the die half 22 on the transfer body 38. Due to the additional mounting or fixing by a bolt or a screw through the elongate hole 29 of the die half 22 and through the fixing bore 28 of the cover plate 20 the die half 22 is nevertheless held on the cover plates 20 under the provision of a securing against getting lost. However, there is no support of the crimping force via the bolt or the screw which extends through the elongate hole 29 and no support of the crimping force via the transverse bolts 32, 33. With an increase of the crimping force when running through the crimping stroke the crimping force is transferred from the die half 22 via the back surface 41 of the same to the transfer surface 40 of the transfer body 38 and so to the piezo foil 36. The signal of the piezo foil 36 is then transmitted via the connecting cable 48 to the electronic assembly unit 15. Due to the support of the supporting body 39 via a pivot bearing 44 on the pliers jaw 4 it is possible that the supporting body 39 (and so also the die half 22) self-acting aligns in a way such that the crimping force always has an orientation vertical to the transfer surface 40 and so to the piezo foil 36. It is possible that for this alignment the supporting body 39 and the die half 22 are commonly pivoted about the pivot axis 45. This pivoting movement might only occur during the assembly or also during the crimping stroke dependent on the actual direction of the crimping force. However, it is also possible that additional to the change of the orientation there is also a sliding movement between the die half 22 and the force sensor unit 37 in a plane transverse to the effective crimping force, so that there is a sliding movement in the contact surface between the transfer surface 40 and the back surface 41.

Instead, for the other die half 51 there is a direct support of this die half 51 by the transverse bolts 52, 53 on the pliers jaw 5, here the pliers jaw plates 54.

It is possible that the piezo foil 36 is folded to at least two layers having the same sensor surfaces (in particular at a location between the transfer body 38 and the supporting body 38). Both sensor surfaces are then biased by the crimping force and the associated contact pressure per area unit. As a consequence the load change of the piezo elements induced by the crimping force is increased and the sensitivity of the force sensor is increased.

In the crimping pliers 1 an L-shaped pliers jaw plate can be used. With respect to this design and the connection of the L-shaped pliers jaw plate to other components by fixing bolts and the advantages that can be achieved reference is made to the European patent application EP 3 553 900 A1 (corresponding to US 2019/0314966 A1) which is incorporated by reference into the present patent application.

Many variations and modifications may be made to the preferred embodiments of the invention without departing substantially from the spirit and principles of the invention. All such modifications and variations are intended to be included herein within the scope of the present invention, as defined by the following claims.

I claim:

1. Crimping pliers for crimping a workpiece, the crimping pliers comprising
   a pliers jaw;
   a die half which is supported on the pliers jaw;
   a force sensor for measuring a crimping force biasing the die half, the force sensor comprising a piezo foil;
   a force sensor unit wherein the piezo foil is sandwiched between a transfer body and a supporting body, the supporting body being supported on the pliers jaw;
   the force sensor unit being mounted to the pliers jaw for being pivoted about a pivot axis which has an orientation vertical to the crimping force.

2. The crimping pliers of claim 1, wherein the die half is exchangeable and comprises a die back which is pressed at least with a crimping force component of the crimping force against the transfer body.

3. The crimping pliers of claim 2, wherein the die half is mounted to the pliers jaw by at least one mounting means with a provision of a play or remaining degree of freedom of the die half relative to the pliers jaw
   a) in a direction of the crimping force and/or
   b) for being pivoted about a pivot axis having an orientation vertical to the crimping force.

4. The crimping pliers of claim 1, wherein the piezo foil is adhered to the supporting body and/or to the transfer body.

5. The crimping pliers of claim 1, wherein the die half and the force sensor unit are supported on a fixed pliers jaw or on a fixed pliers body which comprises a fixed pliers jaw.

6. The crimping pliers of claim 1, wherein the force sensor is connected electrically to an electronic assembly unit.

7. The crimping pliers of claim 1, wherein a displacement sensor is provided which senses a displacement of a component of a drive mechanism of the crimping pliers over a crimping stroke.

8. The crimping pliers of claim 6, wherein a displacement sensor is provided which senses a displacement of a component of a drive mechanism of the crimping pliers over a crimping stroke.

9. The crimping pliers of claim 1, wherein the die half comprises two die half parts which are connected to each other by at least one transverse bolt which protrudes on both sides from the die half parts, a play or degree of freedom in a direction of the crimping force being established between the transverse bolt and the pliers jaw.

10. The crimping pliers of claim 9, wherein another die half is held on another pliers jaw, the other die half comprising at least one transverse bolt which protrudes on both sides from the other die half, no play in a direction of the crimping force being established between the transverse bolt and the other pliers jaw.

11. A group of crimping pliers, the crimping pliers of the group each comprising
 a) a first pliers jaw and a first die half supported on the first pliers jaw and
 b) a second pliers jaw and a second die half supported on the second pliers jaw;
 c) the first die half comprising at least one first transverse bolt which protrudes on both sides from the first die half,
 d) the second die half comprising at least one second transverse bolt which protrudes on both sides from the second die half,
 e) the group of crimping pliers comprising
  ea) a first group part of first crimping pliers comprising
   a force sensor for measuring a crimping force biasing the first die half, the force sensor comprising a piezo foil;
   a force sensor unit wherein the piezo foil is sandwiched between a transfer body and a supporting body, the supporting body being supported on the first pliers jaw;
   the first transverse bolt being supported with a play in a direction of the crimping force on the first pliers jaw and
  eb) a second group part of second crimping pliers,
   second crimping pliers having no force sensor and having no force sensor unit;
   in the second crimping pliers the first transverse bolt being supported without a play in a direction of a crimping force on the first pliers jaw;
 f) the first die half and the second die half of the first crimping pliers and of the second crimping pliers having identical designs.

* * * * *